United States Patent
Kamijo et al.

[11] Patent Number: 5,824,184
[45] Date of Patent: Oct. 20, 1998

[54] STRUCTURE FOR REMOVING A PEEL-OFF BACKING FROM AN ADHESIVE TAPE

[75] Inventors: Noriyuki Kamijo, Suwa; Kenji Watanabe, Tokyo; Takanobu Kameda, Tokyo; Tomoyuki Shimmura, Tokyo; Chieko Aida, Tokyo, all of Japan

[73] Assignees: Seiko Epson Corporation; King Jim Co., Ltd., both of Tokyo, Japan

[21] Appl. No.: 513,370

[22] Filed: Aug. 10, 1995

[30] Foreign Application Priority Data

Aug. 10, 1994 [JP] Japan .................................. 6-188264

[51] Int. Cl.⁶ ..................................................... B32B 35/00
[52] U.S. Cl. .......................... 156/584; 156/344; 156/249; 271/280
[58] Field of Search ..................... 156/344, 584, 156/94, 241, 249; 271/280, 281, 285

[56] References Cited

U.S. PATENT DOCUMENTS

| | | | |
|---|---|---|---|
| 4,183,751 | 1/1980 | Matsumoto et al. | 156/584 X |
| 4,732,642 | 3/1988 | Ametani | 156/584 X |
| 4,861,411 | 8/1989 | Tezuka | 156/584 X |
| 5,323,918 | 6/1994 | Fair | 156/584 X |
| 5,403,412 | 4/1995 | Hidaka et al. | 156/344 X |
| 5,492,590 | 2/1996 | Sakai | 156/344 |

FOREIGN PATENT DOCUMENTS

4-294734 10/1992 Japan.
5-169749 7/1993 Japan.

*Primary Examiner*—Mark A. Osele
*Attorney, Agent, or Firm*—Loeb & Loeb LLP

[57] ABSTRACT

The invention provides a structure in which an adhesion means that rotates, rocks, or reciprocates is pressed onto at least one side of an adhesive tape. The peel-off backing is subsequently removed from a base material of the adhesive tape by applying force on the adhesion means in the direction that separates the peel-off backing from the base material. The relative magnitudes of adhesive strengths are important, and the use of means such as end adhesion, end creasing, and slight delamination increase the effectiveness of the structure. After delamination, separation hooks separate the elements from the adhesion means.

16 Claims, 6 Drawing Sheets

STRUCTURE FOR REMOVING A PEEL-OFF BACKING FROM AN ADHESIVE TAPE

BACKGROUND OF THE INVENTION

1. Field of the Invention

The invention relates to a structure for removing a peel-off backing from an adhesive tape. This type of tape has been widely used in applications such as in tape wordprocessors. An example of this type of tape is the wide peelable opaque tape used in postcards to cover confidential information for privacy protection.

2. Description of the Related Art

As an example, the conventional adhesive tape with peelable backing used in the well-known tape wordprocessors is now explained.

Tape wordprocessors are used for creating title stickers for file folders, and lettering and graphics for window displays. Special-purpose tape is installed in the tape wordprocessor, lettering and graphics are printed by a thermal printer, and then the tape is cut.

Figure 1:
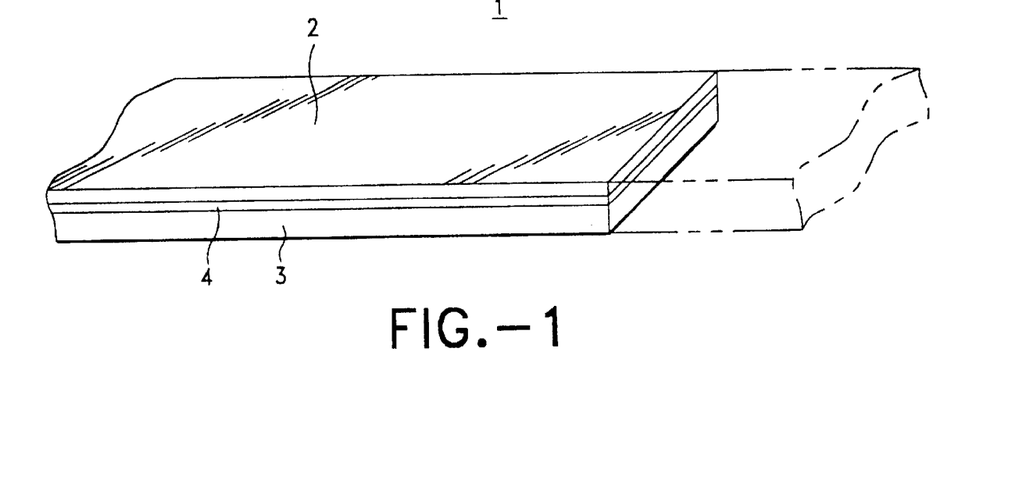
FIG. 1 is an external isometric drawing of the adhesive tape used in the invention and in a conventional structure.

The special-purpose tape is referred to as an adhesive tape with peel-off backing. As shown in FIG. 1, at least base material 2 (normally consisting of plastic or paper), on which the lettering, etc. is printed, is thinly coated with adhesive compound 4; peel-off backing 3 is then adhered to the bottom side over adhesive compound 4 at an adhesive strength that is less than that between base material 2 and adhesive compound 4.

Because special-purpose tape 1 has the above-mentioned configuration, after cutting it, the user can create attractive lettering or graphics in a desired location by simply removing peel-off backing 3 on the bottom side of tape 1 from adhesive compound 4, and placing base material 2 possessing adhesive in the desired location without the use of glue, etc. Because of this attractive finish and convenience, the tape has been well received in the market.

When placing adhesive tape 1 with peel-off backing, it is necessary to peel off peel-off backing 3 as explained above. However, the total thickness of the tape is only 0.1 to 0.3 mm, making it rather difficult and troublesome to grasp and separate peel-off backing 3 from base material 2.

Figure 11A:
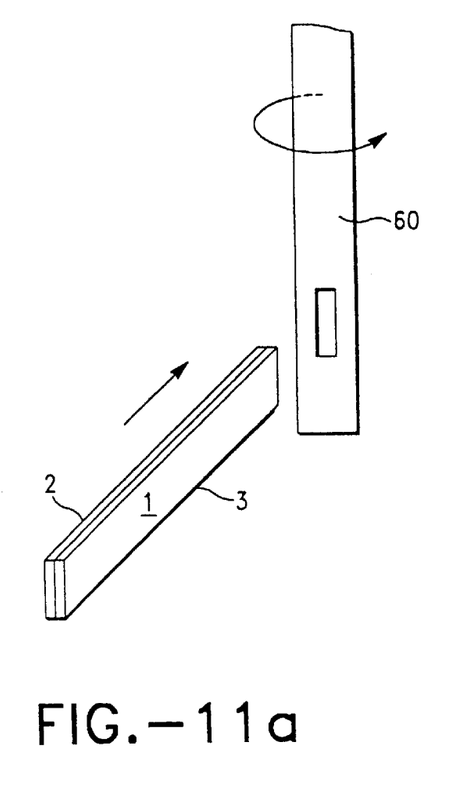
FIG. 11(a) is an isometric drawing showing a conventional structure and method.

Furthermore, in some cases, as shown in FIG. 11(a), tape 1 is inserted into a hole in thin cylinder 60 and is wrapped around cylinder 60. Then the cylinder 60 is slid linearly in its original direction.

Figure 11B:
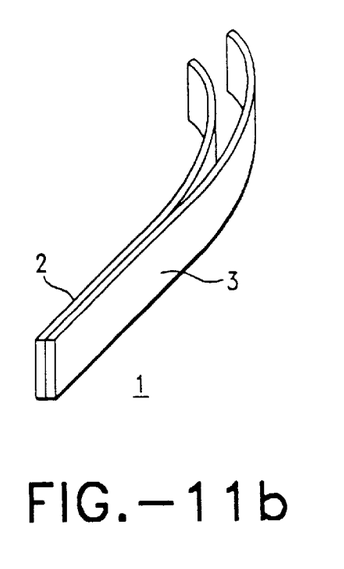
FIG. 11(b) is an isometric drawing of the adhesive tape showing the state in which the adhesive tape has been separated in a conventional structure.

When wrapping the tape onto the cylinder, the difference in the thicknesses of base material 2 and peel-off backing 3 causes a difference in the wrapping radii, creating slippage between the two elements and weakening the adhesion between them. Furthermore, the existing means of separating the two elements uses plastic deformation of base material 2 or peel-off backing 3, caused by unwinding them through the linear movement of cylinder 60 as shown in FIG. 11(b). However, this means rubs the printed surface of base material 2 and causes deterioration in the quality of the print. Additionally, threading tape 1 into the small hole is troublesome; and while such threading can be manually performed, it is difficult to mechanically automate this threading process due to structural or power limitations. Thus, such a means is not suitable to small tape wordprocessors.

Furthermore, when base material 2 has been greatly deformed as shown in FIG. 11(b), and is subsequently printed, its appearance deteriorates due to the irregularity caused on its surface, and the possibility increases that the tape will fall off after adhesion.

The invention is intended to solve the above-mentioned problems.

SUMMARY OF THE INVENTION

It is a principal objective of the invention to provide a structure for primarily automatically or manually separating and peeling off the peel-off backing from the base material of an adhesive tape. It is another principal objective of the invention to make the structure as simple and small as possible, without causing any damage to the base material.

According to the invention, a structure for removing a peel-off backing from an adhesive tape is provided. The adhesive includes the peel-off backing on one side, a base material on an opposite side and an adhesive compound sandwiched between the peel-off backing and the base material. According to a first aspect of the invention, the structure includes adhesive means that applies adhesion onto at least one side of the adhesive tape so that the adhesive tape adheres to the adhesion means. The adhesion means applies a stronger adhesive strength onto the adhesive tape than both that between the adhesive compound and the peel-off backing and that between the adhesive compound and the base material. The structure also includes pulling means that pulls adhesion means to cause the peel-off backing and the base material to be separated from each other.

According to a second aspect of the invention, the adhesion means of the structure applies adhesion at an end or a corner area of at least one side of the adhesive tape.

According to a third aspect of the invention, the structure includes a pair of adhesion means each for applying adhesion onto one side of the adhesive tape. At least one adhesion means applies adhesive strength at an end area of the adhesive tape.

According to a fourth aspect of the invention, the adhesion means has a width narrower than that of the adhesive tape and is positioned eccentrically from the center of the adhesive tape.

According to a fifth aspect of the invention, the pulling mean pulls the adhesion means by rotation or reciprocation.

According to a sixth aspect of the invention, the structure includes a support; a pair of levers each having a first end mounted on the support and being rotable around the point at which the first end and the support are connected; a pair of adhesion means each mounted on a second end of one of the levers for applying adhesion onto the adhesive tape; and means for causing the levers to be closed against each other so that both adhesion means press on the adhesive tape placed in between the levers, and for causing the levers to open, after pressing onto the adhesive tape, to separate the peel-off backing from the base material. The structure also includes tape positioning means that positions the adhesive tape relative to the levers.

According to a seventh aspect of the invention, the length of a free end of the adhesive tape on which adhesion is not applied is not greater the width of the adhesive tape.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Working Example 1

Working example 1 of the invention will be explained in detail with reference to FIGS. 1 and 2.

FIG. 1 is an isometric drawing of adhesive tape 1 with peel-off backing, used in the invention. FIG. 2 is an isometric drawing showing the backing separation structure of the adhesive tape with peel-off backing according to the invention.

In these Figs., 1 is a well-known adhesive tape with peel-off backing, which comprises base material 2 whose plastic or paper surface is printed using a tape wordprocessor, etc., adhesive compound 4 which is adhered to the base material 2, and peel-off backing 3 which is adhered to the adhesive compound 4. As is well known, the adhesive strength between the peel-off backing 3 and the adhesive compound 4 is made weaker than that between the base material 2 and the adhesive compound 4.

This difference in adhesive strength is usually achieved by treating the surface of the peel-off backing 3 with a substance such as silicon. This structure allows the adhesion between the base material 2 and the adhesive compound 4 to remain intact while allowing only peel-off backing 3 to be peeled off when the user tries to separate peel-off backing 3 from base material 2.

It is not necessary to make any particular modifications to the tape structure when implementing the invention.

In the invention, the adhesive tape 1 with peel-off backing is first installed in a tape wordprocessor, etc., and lettering, graphics, etc., are printed on the surface of base material 2. The tape is then cut to a desired length using a known cutter.

Adhesive tape 1 with peel-off backing, which has been cut, is inserted into the specified opening (not shown in the Fig.) in the tape wordprocessor. Then, as shown in FIG. 2, the sensor (not shown in the Fig.) detects the insertion of the tape, and rotates rollers 5 and 6 in the direction of the arrows via a drive mechanism comprising a known motor, and gears, etc.

At least the surface of the rollers 5 and 6 is formed using an adhesion means, such as rubber which possesses adhesiveness. Since the two rollers are positioned at a distance that is slightly narrower than the thickness of the adhesive tape 1, the adhesive tape 1 proceeds while being pressed by the rollers 5 and 6 when it is guided between these rollers.

Consequently, base material 2 having the printing surface of adhesive tape 1 with peel-off backing adheres to roller 5, and the peel-off backing 3 adheres to roller 6. The adhesion between the base material 2 and the roller 5, and that between the peel-off backing 3 and the roller 6 begins at the cut end because of the structure described above. The base material 2 and the peel-off backing 3 of the adhesive tape 1 with peel-off backing gradually begin to be separated as the distance between the surfaces of the rollers 5 and 6 increases after the tape 1 passes through the smallest-gap area between the rollers (on the line connecting the rotation centers of the rollers 5 and 6).

The important elements in creating such an effect are the differences among at least the adhesive strength between the peel-off backing 3 and the adhesive compound 4, the adhesive strength between the peel-off backing 3 and the adhesion means 6, and the adhesive strength between the base material 2 and the adhesion means 5.

In other words, the relationship among these strengths can be expressed as $P \geq F \leq W$ where F indicates the adhesive strength between the peel-off backing 3 and the adhesive compound 4, P indicates the adhesive strength between the peel-off backing 3 and the adhesion means 6, and W indicates the adhesive strength between the base material 2 and the adhesion means 5.

Adhesive strength can be expressed in two ways in this case; i.e., as adhesive strength per unit area or as total adhesive strength which is the product of the adhesive strength per unit area and the contact area between individual elements.

During the separation action, the adhesion of the adhesion means 5 and 6 may not begin at the cut end of the peel-off backing 3 and base material 2. The adhesion does not then occur in an area located between the cut end and the adhesion start area (i.e. between the adhesion means 5 or 6 and the base material 2 or the peel-off backing 3, respectively). If the size of that area where adhesion does not occur exceeds a certain size then, even if the adhesive strength per unit area between the peel-off backing 3 and adhesive compound 4 is made smaller than the adhesive strength per unit area between other elements as explained above, the adhesive strength per unit area will be larger than the total adhesive strength (the area x adhesive strength per unit area) corresponding to the contact area between the peel-off backing 3 and the adhesion means 6, by an amount equaling the total adhesive strength (the area x adhesive strength per unit area) corresponding to the area of the peel-off backing 3 and the adhesive compound 4 in the area where adhesion did not occur. Consequently, the peel-off backing 3 and the base material 2 might not be separated even after passing through the separation structure.

In this case, the peel-off backing 3 and the base material 2 are not separated even after the adhesive tape 1 passes through the separation structure; and the tape 1 might become wrapped around one of the rollers (adhesion means), or might be linearly ejected from the separation structure without being wrapped around either of the rollers due to its rigidity.

In working example 1, because both the adhesion between the peel-off backing 3 and adhesion means 6, and the adhesion between the base material 2 and adhesion means 5 begin at the cut end of the adhesive tape 1 with peel-off backing, the adhesion area between the adhesive compound 4 and the peel-off backing 3 can be minimized to be close to zero when the adhesion between the adhesion means 6 and the peel-off backing 3 is used to separate the adhesion between the peel-off backing 3 and the adhesive compound 4. Therefore, if the contact area between the adhesion means 6 and the peel-off backing 3 is set to a certain value as described above, the total adhesive strength between the peel-off backing 3 and the adhesion means 6 can easily be made larger than the total adhesive strength between the peel-off backing 3 and the adhesive compound 4, based on the relationship among the adhesive strengths per unit area between the elements. In such a case, the base material 2 and the peel-off backing 3 can be easily separated as shown in FIG. 2.

This is possible because at least the peripheral areas of the rollers 5 and 6 are formed using a soft elastic material such as adhesive rubber, and the elastic area of the adhesive rubber becomes deformed when the elastic material is pressed onto the tape 1 from both sides, increasing the area of contact with the adhesive tape 1, compared to a case in which a rigid material is used for the rollers. Furthermore, the recovering force of the elastic area can be effectively used during the separation.

When the peel-off backing 3 and the base material 2 are separated, the adhesive compound 4 remains adhered to the bottom of the base material 2. This occurs because the adhesive strength between the adhesive compound 4 and the base material 2 is larger than that between the adhesive compound 4 and the peel-off backing 3.

Even when these contact areas are equal in size, the objective of the invention is achieved because the adhesive strength per unit area between the peel-off backing 3 and the adhesive compound 4 is smaller than (a) the adhesive strength per unit area between the base material 2 and the adhesive compound 4, (b) the adhesive strength per unit area between the base material 2 and the adhesion means 5, and (c) the adhesive strength per unit area between the peel-off backing 3 and the adhesion means 6.

In general, because the surface of the peel-off backing 3 is treated with a substance such as silicon, keeping the adhesion with the adhesive compound 4 at a minute level as described above, the adhesive strength among the aforementioned other elements need not be so large. For example, materials possessing relatively small adhesive strength (per unit area), such as a well-known adhesive rubber, can be used as the adhesion means.

Furthermore, experiments have shown that, in addition to adhesive rubbers, materials such as known cellophane tapes with adhesive compounds can be used as the adhesion means to obtain similar effects.

In this way, the base material 2 with printing and the peel-off backing 3 can be easily separated without the use of excessive force or deformation when the adhesive tape 1 with peel-off backing is passed through the separation structure described in working example 1.

Figure 2:
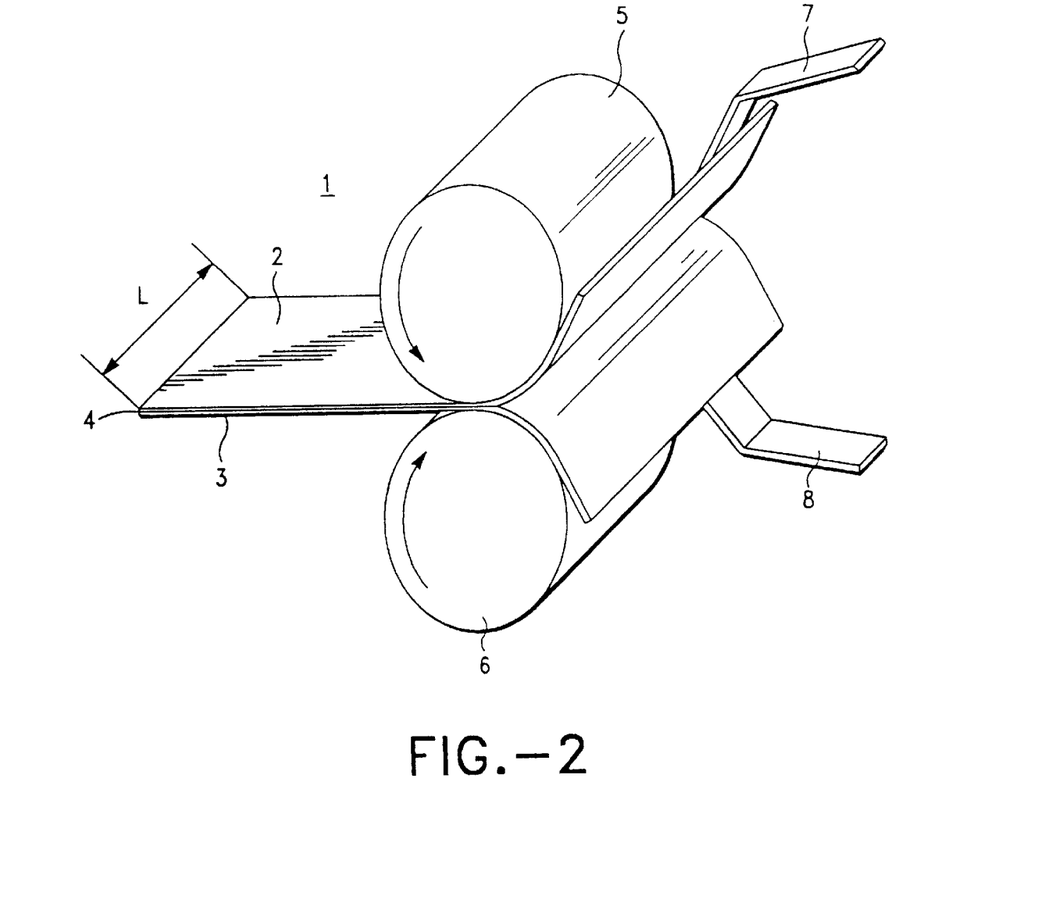
FIG. 2 is an isometric drawing showing the structure of working example 1 of the invention.

Furthermore, as shown in FIG. 2 and described in detail above, the separation structure is simple in that rotating adhesion means 5 and 6 comprising a material such as adhesive rubber are positioned facing each other, and thus its cost is low, and does not adversely affect miniaturization of equipment such as the tape wordprocessor explained as an example above.

In FIG. 2, separation hooks 7 and 8 are provided in the separation structure as the means of subsequently separating the peel-off backing 3 and the base material 2 from the adhesion means 5 and 6 after peel-off backing 3 and the base material 2 of the adhesive tape 1 with peel-off backing are separated using the means described above.

FIG. 2 shows a structure in which the adhesion means 5 and 6 are positioned eccentrically on one side of width L of the adhesive tape 1 with peel-off backing rather than in the center, and in which separation hooks 7 and 8 are positioned on the other side of width L of the adhesive tape 1 with peel-off backing. This is also one of the major characteristics of the invention.

The reason for the above structure is that the ends of the separation hooks 7 and 8 can firmly engage with the base material 2 and peel-off backing 3 without interfering with the adhesion means 5 or 6.

If the adhesion means 5 and 6 and the separation means 8 and 7 are positioned on the same plane on width L of the adhesive tape 1, the ends of the separation hooks 7 and 8 need to face the adhesion means 5 and 6 while maintaining a gap that is smaller than the thickness (approximately 0.1 mm) of the base material 2 and peel-off backing 3, and to engage with the base material 2 and peel-off backing 3 without interfering with the adhesion means 5 or 6. Such requirements will be difficult to satisfy because of the variations in the elements, and may result in serious reliability problems.

As shown in FIG. 2, according to the structure of the invention, by inserting the adhesive tape 1 with peel-off backing from the left side of the Fig. into the roller-type rotating adhesion means 5 and 6, the adhesive tape 1 can be continuously and automatically separated into the base material 2 and the peel-off backing 3 as described above, and then the separated elements can subsequently be continuously and automatically separated from the adhesion means 5 and 6 by the separation hooks 7 and 8, which is easier than manual separation as conventionally done, and is easier to use than the structure explained in the conventional example.

Furthermore, the configuration of working example 1 of the invention provides a simple and highly reliable separation structure.

In this way, the base material 2 and the peel-off backing 3 are mechanically, automatically and silently separated from the adhesive tape 1 with peel-off backing continuously supplied through the rotation of the adhesion means 5 and 6, and then the base material 2 and the peel-off backing 3 are subsequently continuously separated from the adhesion means 5 and 6 by the separation hooks 7 and 8, and flow out along the inside of the separation hooks 7 and 8.

Users of the tape wordprocessor then simply adhere the base material 2, thus separated and discharged, to the desired location using the adhesive compound 4.

Although the adhesion means 5 contacts the base material 2 possessing a printed surface, the deformation of the printed surface that occurs in the conventional example, does not occur in this working example. Therefore, unlike in the conventional example, the problem of print quality degradation by the adhesion means 5 is not encountered, and the deformation of base material 2 is minimal; thus, a beautiful finish can be obtained.

When the structure of working example 1 shown in FIG. 2 is used, it is possible to take out the base material 2 and the peel-off backing 3 from the right side of FIG. 2 as separate elements. After these elements are separated to the end opposite the end of the adhesive tape 1, the material 2 and the peel-off backing 3 are subsequently separated from the adhesion means 5 and 6 by the separation hooks 7 and 8. Therefore, in the end, nothing remains on the adhesion means 5 and 6, allowing their continuous use and preserving their durability.

This effect is the result of locating the separation hooks 7 and 8 in a position that is in front of the position where the cut ends of the adhesive tape go around the adhesion means 5 and 6 one full turn.

If the separation hooks 7 and 8 are located in a position that is after the full turn position, the base material 2 and peel-off backing 3 will remain adhered to the adhesion means 5 and 6 and will be taken up with the material that is being fed into the rollers, making it impossible to continuously use the separation structure.

Furthermore, in the process of separating the adhesive tape 1 into the base material 2 and peel-off backing 3 starting at the end, slight delamination occurs between the base material 2 and peel-off backing 3 because of the slight deformation that occurs when the end is cut while the two elements are still securely adhered to each other, and because the stable state is disturbed by the residual stress in base material 2 and peel-off backing 3.

Consequently, the structure of the invention, which adheres the adhesion means 5 and 6 to the vicinity of the area, and which subsequently separates the adhesive tape starting at the area, provides an extremely high degree of separation effect.

Working Example 2

Working example 2 of the invention will be explained with reference to FIGS. 3 and 4.

Working example 1 explained a structure in which adhesive tape 1 with peel-off backing is continuously separated. Although it is advantageous in some cases to use such a structure, in which continuously separated base material 2 is discharged as in working example 1, it could be difficult to handle the base material 2 of the discharged adhesive tape if the peel-off backing 3 is separated from a long piece of tape using the structure, because the adhesive compound 4 is left exposed on one of the surfaces of the base material 2.

This is because the static electricity that remains on adhesive tape 1 immediately following its discharge, or the effect of the weight of the tape, the ambient air flow, etc., may cause the base material 2 to stick to itself, rendering the tape useless.

This working example describes a peel-off backing separation structure that is suitable to tapes with long cut length.

Figure 3:
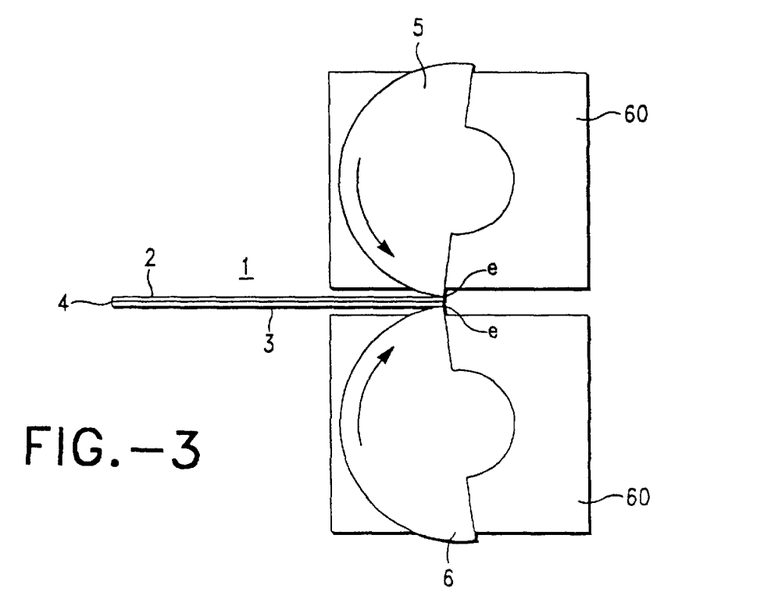
FIG. 3 is a side view showing the structure of working example 2 of the invention.

FIG. 3 is a side view of the main area and shows a state in which the adhesive tape 1 with peel-off backing is beginning to be inserted from the left side. FIG. 4 is also a side view showing a state in which the adhesive tape 1 with peel-off backing has proceeded from the state in FIG. 3, and is separated into the base material 2 and peel-off backing 3.

The operation of the working example will be explained below.

First, as shown in FIG. 3, the adhesive tape 1 with peel-off backing possessing the structure is inserted from the left side of the separation structure. A detector such as a photosensor (not shown in the Fig.) detects the insertion of the tape, and adhesion means 5 and 6, which comprise a material such as adhesive rubber, which are fixed on the axes of step motors 60 and 60, and which have been stopped in the positions shown in the Fig., begin to rotate in the directions of the arrows. As described above, this operation takes place when a photosensor, etc., detects the cut end of the adhesive tape 1 and when the end comes near exterior edges e and e of the adhesion means 5 and 6. Thus, the rotation causes the end of the adhesive tape 1 with peel-off backing to contact the exterior edges e and e of the adhesion means 5 and 6, and the adhesive tape 1 is taken in the horizontal direction.

Since the gap between the periphery of the adhesion means 5 and 6 is set slightly narrower than the thickness of the adhesive tape 1, both the adhesion means 5 and 6 apply strong pressure on the adhesive tape 1.

The pressure causes the adhesion means 5 and 6 to adhere to the base material 2 and the peel-off backing 3, which together constitute the adhesive tape 1.

Figure 4:
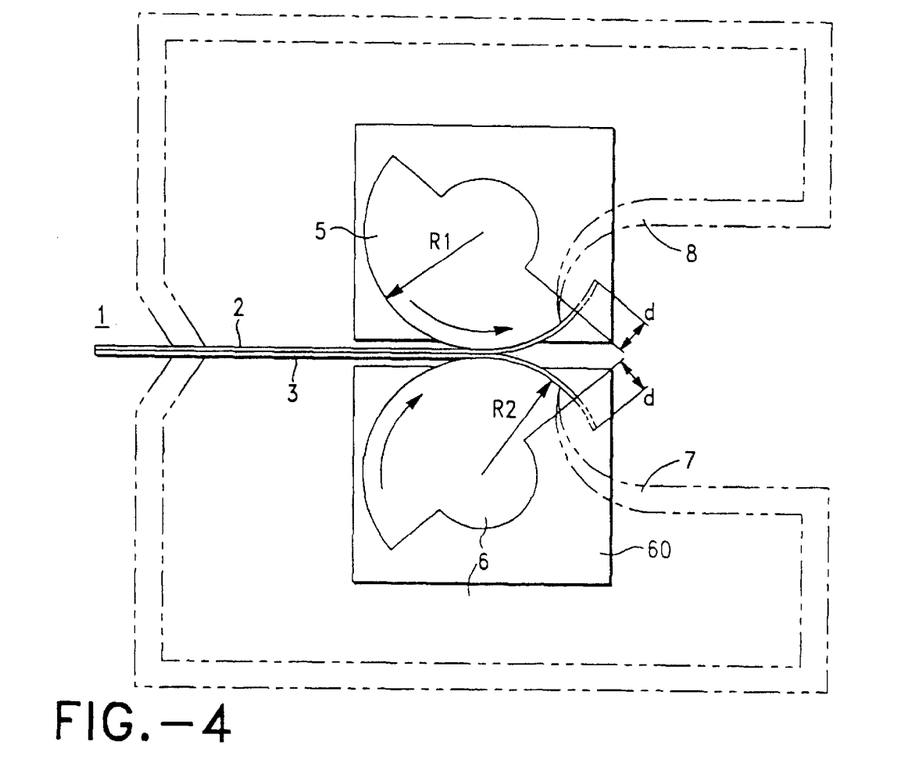
FIG. 4 is a side view showing the state in which the adhesive tape has been separated from the state in FIG. 3, in working example 2 of the invention.

The separation structure moves to the state shown in FIG. 4 as step motors 60 and 60 rotate, the base material 2 is wound on the periphery of the adhesion means 5 by an effect similar to that described in working example 1, and the peel-off backing 3 is wound by the effect of adhesion means 6.

When the positional relationships of various elements shift to those shown in FIG. 4 (this can be preset using the step count of the step motor, or a photosensor similar to that described above can be used to detect the position of adhesive tape 1), the rotation of the adhesion means 5 and 6 stops.

When the edges e and e of the adhesion means 5 and 6 and the end of the adhesive tape 1 are located in the positions indicated by the solid lines in FIG. 4 (such that the edges e and e nearly match the end), the motion, which occurs after the cut end of the adhesive tape 1 passes through the gap between the periphery of the adhesion means 5 and 6 located on the line connecting the rotational axes of the adhesion means 5 and 6, separates the base material 2 and peel-off backing 3 which adhere to the periphery of adhesion means 5 and 6, respectively, as shown in FIG. 4 and in a manner similar to that explained in working example 1. During this operation, the base material 2 remains adhered to the adhesive compound 4.

This is because, as explained in working example 1, the adhesive strength per unit area between the base material 2 and the adhesive compound 4 is greater than that between the peel-off backing 3 and the adhesive compound 4; the adhesive strength per unit area between the adhesion means 5 and the base material 2 is greater than that between the peel-off backing 3 and the adhesive compound 4, and furthermore; the adhesive strength per unit area between the adhesion means 6 and the peel-off backing 3 is greater than that between the peel-off backing 3 and the adhesive compound 4.

Although the preceding sections referred only to the difference in adhesive strength per unit area, total adhesive strength, which is the product of the adhesive strength per unit area and the contact area between individual elements in each operational state, also naturally plays a role.

For example, if the cut end of the adhesive tape 1 sticks out beyond the edges e and e of the adhesion means 5 and 6 by distance d as indicated by the imaginary lines in FIG. 4, and if the area of the tape corresponding to the distance d is free without being adhered to either of the adhesion means 5 or 6, the tape may not separate as shown in FIG. 4, depending on the magnitude of d.

The reason for this is as follows. As explained above, if the free state d is too long for some reason (e.g., design, variations in the configuration elements, etc.), the end of the adhesive tape 1 might pass through the minimum gap between the adhesion means 5 and 6 without adhering to them, and the adhesion means 5 and 6 soon begin adhering to the adhesive tape 1. Thus, even if an attempt is made to use subsequent rotation to separate the base material 2 possessing the adhesive compound 4 from the peel-off backing 3, the area between the adhesive compound 4 and the peel-off backing 3, which corresponds to the free state d, is now larger than in the aforementioned state (indicated by the solid lines in FIG. 4). Consequently, the total adhesive strength (adhesion area x adhesive strength per unit area) between the adhesion means 5 and the base material 2 becomes smaller than the total adhesive strength (adhesion area x adhesive strength per unit area) between the adhesive compound 4 and the peel-off backing 3, or the total adhesive strength (adhesion area x adhesive strength per unit area) between the adhesion means 6 and the peel-off backing 3 becomes smaller than the total adhesive strength (adhesion area x adhesive strength per unit area) between the adhesive compound 4 and the peel-off backing 3.

If either of these phenomena occurs, the base material 2 and peel-off backing 3 will not separate because the adhesive tape 1 will adhere to the periphery of either adhesion means 5 or 6, or in the worst case, will not adhere to either of adhesion means 5 or 6 due to its rigidity.

To avoid such a problem, the free state d must be made as small as possible.

As explained above, these separation effects vary depending on the contact area between various elements, and on the adhesive strength per unit area between various elements as described above. According to the results of the experiments carried out by the inventor, it is desirable to approximately set d≦adhesive tape width L (shown in FIG. 2) when the adhesive rubber is used as the adhesion means in an ordinary adhesive tape 1.

Under these conditions, the adhesive strength of the adhesive rubber of the adhesion means, the adhesive strength of the adhesive compound 4, the actual sizes of the contact areas, etc., enable the base material 2 and the peel-off backing 3 to be separated in a desirable state after the adhesive tape 1 is passed through the separation structure.

In working example 2, the rotation of the adhesion means 5 and 6 stops in the state shown in FIG. 4. Therefore, after making the minimum gap larger than the thickness of the adhesive tape 1 by moving either of step motors 60 and 60 in the direction that increases the distance between the two axes, the user of the tape wordprocessor can then separate the adhesive tape 1 from the adhesion means 5 and 6 by reversing the rotation of the adhesion means 5 and 6, by pulling back the adhesive tape 1 in the direction opposite from its original insertion direction.

In this case, unlike working example 1, only the area near the cut end of the adhesive tape 1 is separated, and the peel-off backing 3 remains adhered to other areas. This method eliminates the effects of static electricity, the weight of the tape, the ambient air flow, etc., which may cause the tape to stick to itself as in Working example 1.

Furthermore, as explained above, by positioning separation hooks 7 and 8 in front of the stop position of the end, and such that the distance between the hook ends and the center of rotation of the adhesion means 5 and 6 is slightly larger than external radii $R_1$ and $R_2$ of the adhesion means 5 and 6, the base material 2 and peel-off backing 3 can be subsequently separated from the adhesion means 5 and 6 before the movement of the adhesion means 5 and 6 stops. With such a set-up, the decrease in the contact areas between the adhesive tape 1 and the adhesion means 5 and 6 reduces the adhesive strength, and thus it becomes easy to extract the adhesive tape 1 from the separation structure with the separated ends intact by sliding the left end of the adhesive tape 1 in the direction perpendicular to the diagram in FIG. 4, without having to pull out the adhesive tape 1 in the direction opposite from its original insertion direction.

During this operation, the base material 2 and peel-off backing 3 of the adhesive tape 1 have been wound around the periphery of the adhesion means 5 and 6, and have been slightly plastically deformed in opposite directions. Therefore, even after the tape is extracted from the separation structure, it is easy to separate the two elements by hooking a finger on the gap that has been created by the plastic deformation.

After extracting the adhesive tape 1 from the separation structure in this way, the user can easily peel off peel-off backing 3 from the separated end as described above, and can adhere base material 2 with the printed surface to a desired location.

The effects of working example 2 relative to the conventional example are similar to those of Working example 1.

Working Example 3

Working example 3 will be explained with reference to FIG. 5.

Figure 5:
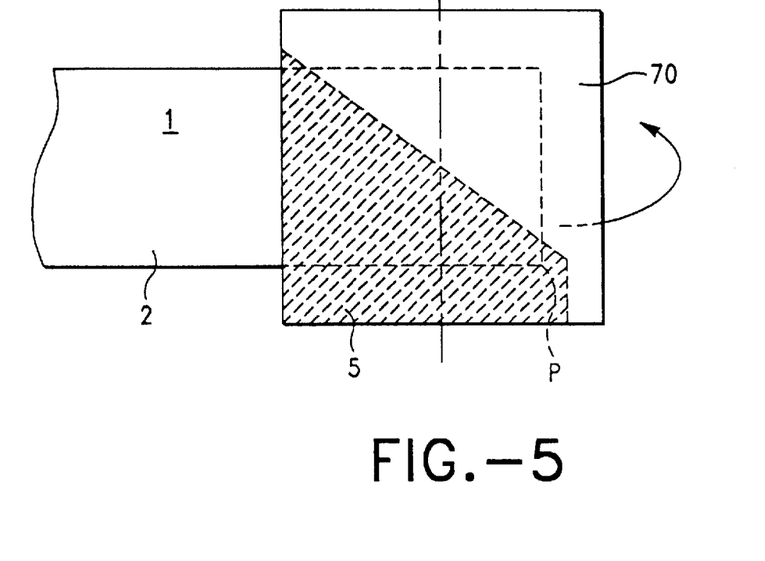
FIG. 5 is a top view showing working example 3 of the invention.

FIG. 5 is a top view showing the relationship between adhesive tape 1 and rotating adhesion means 5, similar to that shown in FIG. 2. The adhesion means 5 is spirally positioned on the periphery of roller 70 as shown in the Fig..

The area of adhesion means 5, surrounded by the hatching, faces the adhesive tape 1 below the roller 70. When adhesion means 5 thus positioned rotates in the direction of the arrow, the adhesion means 5 separates the surface of base material 2 of the adhesive tape 1 beginning at the corner area P.

In this case, the area P is the location at which the contact area between the adhesive compound 4 and peel-off backing 3 is the smallest, and as a result the total adhesive strength (contact area x adhesive strength per unit area) between the adhesive compound 4 and peel-off backing 3 tends to be smaller than the total adhesive strength between the adhesion means 5 and the base material 2, as explained above. Consequently, the peel-off backing 3 easily separates from the adhesive compound 4 from the corner area P.

Furthermore, because the adhesion between the base material 2 and peel-off backing 3 is unstable in the corner area, the area effectively becomes the starting point for separation.

In this case, if the relationship between adhesion means (6) and the peel-off backing 3 is made identical to the state shown in FIG. 5, and if this roller is conFig.d to rotate in the opposite direction from the roller 70, the relationship between the peel-off backing 3 and the adhesion means (6) will become similar to that shown in FIG. 5, making the means more effective.

However, it is not essential to install both of the adhesion means 5 and 6 in the separation structure explained in either of the working examples of the invention.

For example, the structure can be such that either the base material 2 or the peel-off backing 3 of the adhesive tape 1 is fastened between mechanical hooks, etc., or fastened by a suction structure utilizing vacuum, and only the other element is separated by the adhesive effect of either adhesion means 5 or 6.

With such a configuration, the base material 2 and the peel-off backing 3 can be surely and easily separated.

Working Example 4

Working example 4 will be explained in detail with reference to FIGS. 6, 7, and 8.

Figure 6:
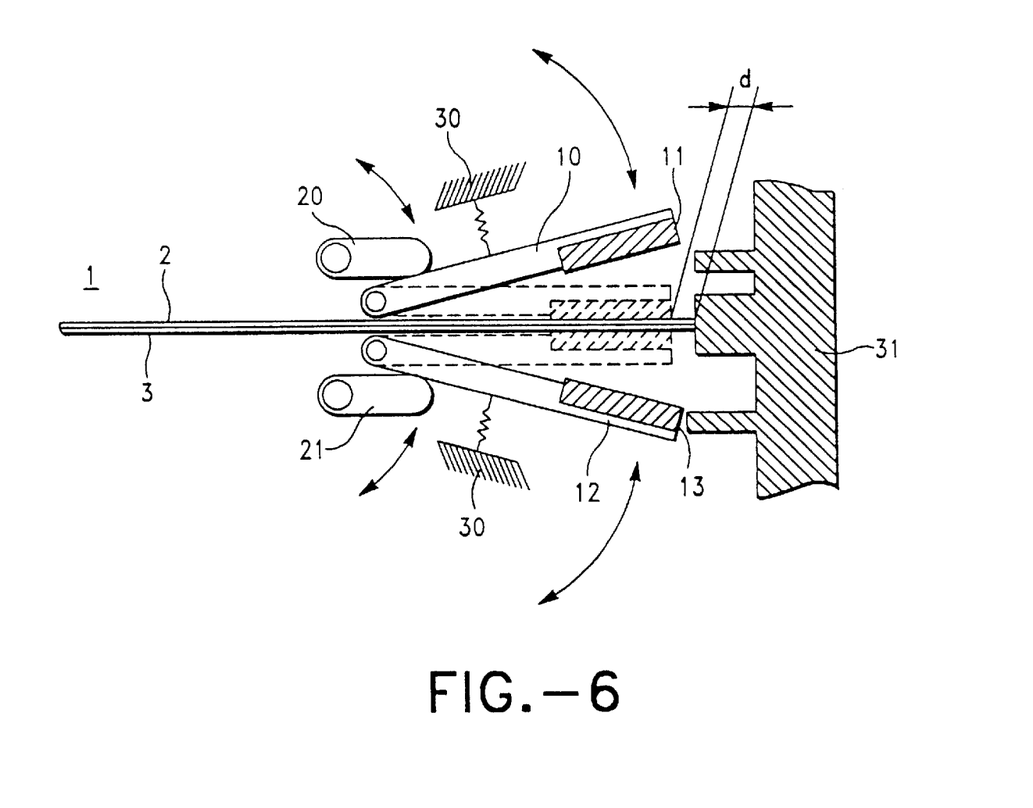
FIG. 6 is a side view showing working example 4 of the invention.

FIG. 6 is a side view of an assembly diagram showing a separation structure possessing a rocking adhesion means. This Fig. shows a state in which adhesive tape 1 is pinched after being installed. FIG. 7 is a side view of an assembly diagram showing a state in which the base material 2 and the peel-off backing 3 of the adhesive tape 1 have been separated from the state in FIG. 6. FIG. 8 is a top view showing an application example of the structures in FIGS. 6 and 7.

In these Figs., 10 indicates a lever with adhesion means 11, made of a material such as adhesive rubber, installed at one of its ends. The other end is connected to an axis.

In the Figs., 12 is also a lever with adhesion means 13 installed at one of its ends, with the other end connected to an axis, in a manner similar to the lever 10. These levers are joined to part of housing 30 of equipment such as the tape wordprocessor via tension springs as shown in the Figs., and are stably positioned as indicated by the solid lines in FIG. 6 in a normal state when the adhesive tape 1 has not been inserted into the separation structure.

When the adhesive tape 1 is inserted into the separation structure and the cut end of the tape comes into contact with tape positioning means 31 of housing 30, the action of a photosensor, etc., triggers lever drive means 20 and 21 to drive the levers 10 and 12 against the tension of the tension springs.

The levers 10 and 12, as well as adhesion means 11 and 13, move to the states indicated by the imaginary lines, and the adhesion means 11 and 13 pinch the adhesive tape 1.

Figure 7:
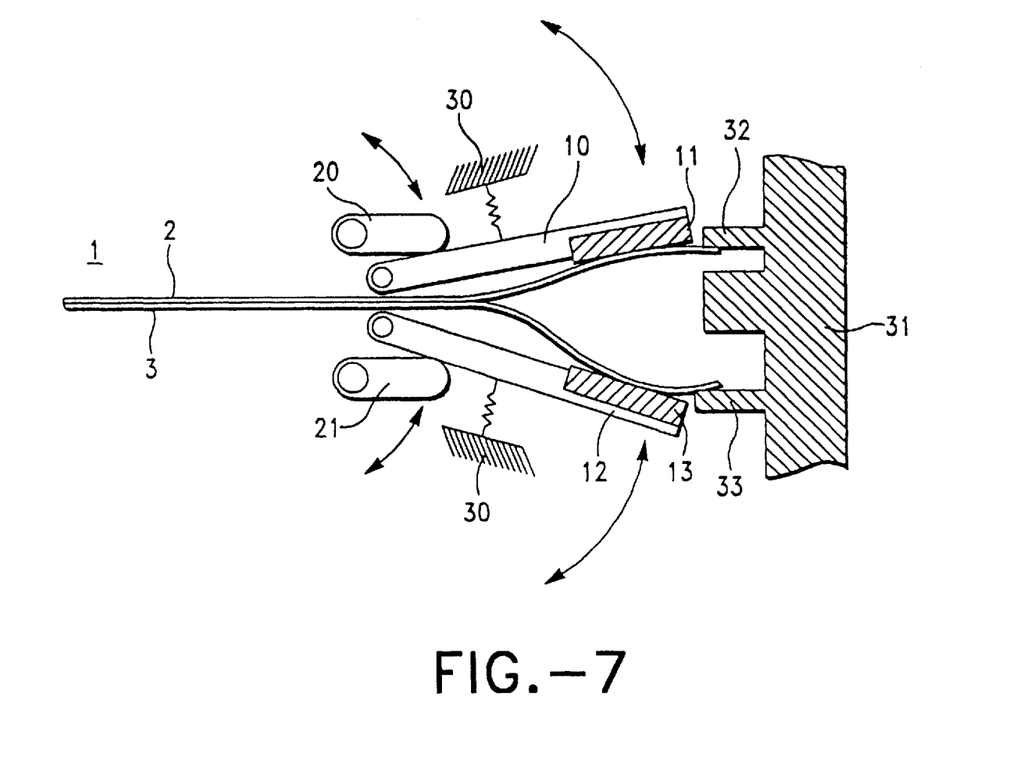
FIG. 7 is a side view drawing showing the state in which the adhesive tape has been separated from the state in FIG. 6, in Working example 4 of the invention.

Subsequently, when the lever drive means 20 and 21 return to the positions indicated by the solid lines in FIG. 6 after a certain amount of time, the levers 10 and 12 are also returned to their original positions as shown in FIG. 7 by the action of the tension springs. During this operation, the base material 2 and peel-off backing 3 of the adhesive tape 1 become separated by the separation action described above because the adhesion means 11 and 13 adhered to these two elements when the adhesive tape 1 was pinched.

Gap d is provided between the positioning means 31 and the adhesion means 11 and 13 as shown in FIG. 6, such that these elements do not interfere with each other while the adhesion means 11 and 13 are pinching the tape.

Separation hooks 32 and 33 are installed in part of housing 30 in order to subsequently separate the base material 2 and peel-off backing 3 from the adhesion means 11 and 13, by using the free end area d positioned both outside the area of adhesion between the base material 2 and the adhesion means 11, and free end area d positioned outside the area of adhesion between the peel-off backing 3 and the adhesion means 13, as shown in FIG. 7.

When the levers 10 and 12 have returned to their original positions as shown in FIG. 7, part of the base material 2 and the peel-off backing 3 are subsequently separated from the adhesion means 11 and 13, leaving small contact areas. From this state, when the user pulls out the adhesive tape 1 toward the left of FIG. 7, the base material 2 and the peel-off backing 3 can then be easily separated from adhesion means 11 and 13, thus offering an easy-to-use separation structure.

In the structure, the adhesion means 11 and 13 are positioned on the right in the end areas away from the rotational centers of the levers 10 and 12. The adhesive tape 1 is inserted from the left of the rotational centers of the levers, and after the inserted end is pressed onto the adhesion means 11 and 13, the base material 2 and the peel-off backing 3 are separated using the adhesive strength of the adhesion means 11 and 13. During the return motions of the levers 10 and 12 following the pressed adhesion and of the adhesion means 11 and 13, the end areas of the adhesion means 11 and 13, which are farther from the rotational centers, travel greater distances than the areas that are closer to the rotational centers.

The reason for this is as follows. When the adhesion means 11 and 13 rotate around the rotational centers, even if their rotational angles are identical, the areas that are farther from the rotational centers travel greater distances than the areas that are closer to the rotational centers. With such positioning, the adhesion means 11 and 13 separate the base material 2 and the peel-off backing 3 starting at the cut end of the adhesive tape 1, at the start of the return motion. In this case, as explained in the previous working example, the operation takes place when the contact area between the adhesive compound 4 and peel-off backing 3 is smaller than the area corresponding to d.

If separation action begins in the area that is closer to the rotational centers, the total adhesive strength will correspond to the area corresponding to the sum total of the length of the adhesion means 11 or 13 in FIG. 6 and the free end d. Even in this case, the separation structure is not impossible if it is conFig.d to satisfy the conditions. However, it will be necessary to increase the total adhesive strength between the adhesion means 11 and the base material 2, or that between the adhesion means 13 and the peel-off backing 3.

As explained above, the elements can be easily separated if the total adhesive strength between the adhesion means 11 and the base material 2, and that between the adhesion means 13 and peel-off backing 3 are set larger than the total adhesive strength for the area between adhesive compound 4 and peel-off backing 3 including the d, in the contact areas between the elements.

However, as explained above, in order to ensure that the separation definitely occurs, it is better to set the length of the free end d such that it satisfies the following relationship: $d \leq L$, where L is the width of the adhesive tape 1 (as shown in FIG. 2).

As explained above, if the free end d is too long, the contact area between the adhesive compound 4 and the peel-off backing 3 increases by an amount corresponding to d. Consequently, when the adhesion means 11 and 13 are performing the separation action, even if the adhesive strength per unit area between the adhesive compound 4 and the peel-off backing 3 is weaker than that between the adhesive compound 4 and the base material 2, or than that between the adhesion means 11 and 13 and the base material 2 and the peel-off backing 3, the total adhesive strength between the adhesive compound 4 and peel-off backing 3 will be larger than that between the adhesion means 11 and 13 and the base material 2 and the peel-off backing 3, and thus it will not be possible to separate the base material 2 and the peel-off backing 3.

Therefore, adhesive tape 1 possessing ordinary adhesive strength, and adhesion means 11 and 13 possessing adhesive strength roughly equaling that of adhesive rubber are used, the condition $d<L$ plays an important role based on empirical results.

Figure 8:
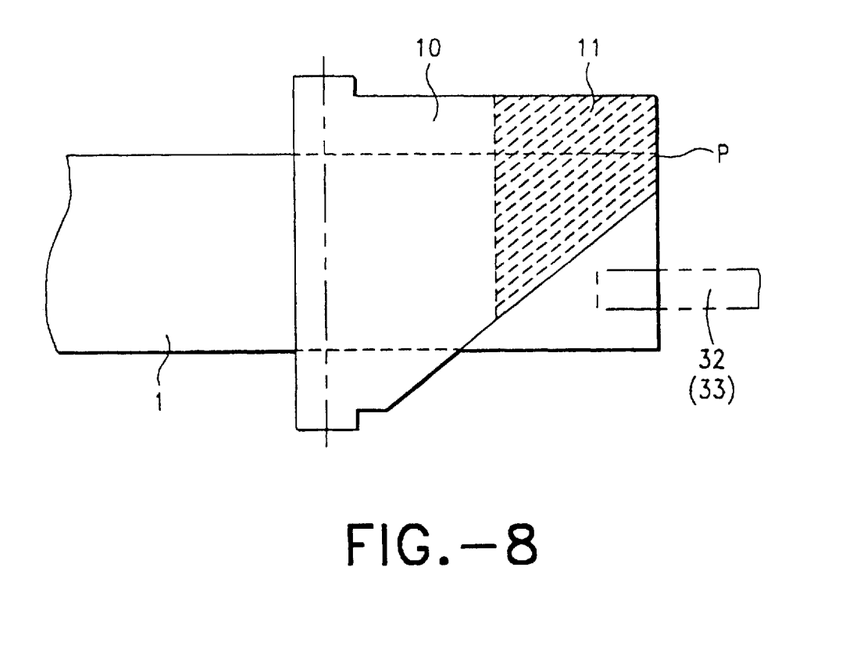
FIG. 8 is a top view showing an applied example of Working example 4 of the invention.

FIG. 8 shows an application example of the structure in working example 4.

When the d exists, and if neither the size difference between the total adhesive strength between the peel-off backing 3 and the adhesive compound 4 and that between the adhesion means 11 and base material 2, nor the size difference between the total adhesive strength between the peel-off backing 3 and the adhesive compound 4 and that between the adhesion means 13 and peel-off backing 3 can be maintained within the conditions, it is better to position the adhesion means 11 eccentrically on one side of the adhesive tape 1 as shown in FIG. 8, such that the separation action begins at corner area P of the adhesive tape 1.

In this way, the base material 2 and the peel-off backing 3, which constitute the adhesive tape 1, can be easily separated using the difference in the contact areas of the various elements, the effect of the adhesive strengths per unit area of the various elements, and the slightly delaminated state that became unstable during the cutting operation.

This consideration is not required for both of the adhesion means 11 and 13; the separation effect can be obtained if the consideration is applied to at least one of the means.

In this way, it is possible to install the separation hooks 32 and 33 in the notches in lever 10. In this structure, even if the free end d does not exist, the adhesive tape 1 can be securely engaged with the ends of the separation hooks 32 and 33, improving the reliability of the subsequent separation of the adhesive tape 1 from the adhesion means 11, and making it possible to reduce the size of information equipment, such as the tape wordprocessor, through the size reduction of the separation structure.

Working Example 5

Working example 5 will be explained in detail with reference to FIGS. 9, 10(a), and 10(b).

Figure 9:
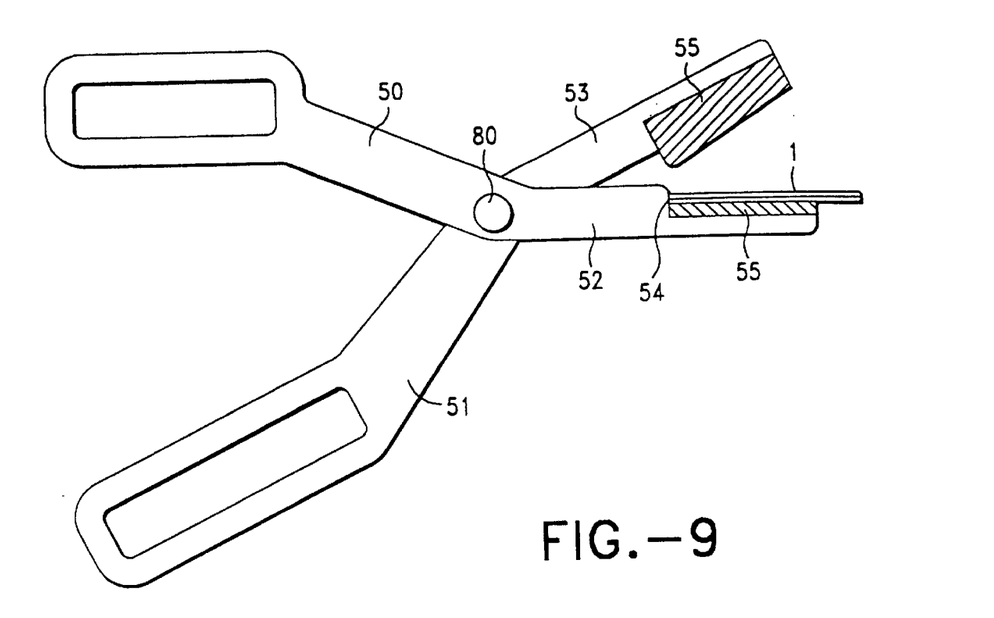
FIG. 9 is a side view showing Working example 5 of the invention.

FIG. 9 is a side view of the separation structure of the working example. FIG. 10(a) is an application example of FIG. 9 and is a partial cross-section viewed from the side of the adhesion means of levers 52 and 53 immediately before the adhesive tape 1 is pinched. FIG. 10(b) shows a state in which the adhesive tape 1 has been separated into the base material 2 and the peel-off backing 3 by opening levers 52 and 53 after first pinching the adhesive tape 1 starting from the state in FIG. 10(a).

The operation of the working example is explained below.

In FIG. 9, lever 50 extends on both sides of rotational center 80, and possesses adhesion means 55, and step 54 which acts as a means of positioning adhesive tape 1 on one end 52, and a finger hole on the other end.

Lever 51 also extends on both sides of rotational center 80, and possesses adhesion means 55 on one end 53, and a finger hole on the other end. These two levers form a scissor-like structure. However, as shown in FIGS. 9, 10(a), and 10(b), it is different from an ordinary pair of scissors in that it possess adhesion means 55 and 55 on the ends, and positioning means 54 which positions the adhesive tape 1 relative to the separation structure on the side of lever 52.

Because of such a structure, to use the structure to separate the adhesive tape 1 into the base material 2 and the peel-off backing 3, the user first inserts the adhesive tape 1 from the front (right side of FIG. 9) of the separation structure until the tape's cut end touches positioning means 54 of the separation structure.

Then, the user manually squeezes the left sides of the levers 50 and 51 of the separation structure, and presses the adhesive tape 1 with the adhesion means 55 and 55.

Then, the adhesion means 55 and 55 adhere to the surfaces of the base material 2 and the peel-off backing 3 of the adhesive tape 1, and when the finger operation area is opened, the adhesion means 55 and 55 release the pressure on the adhesive tape 1.

However, the base material 2 and the peel-off backing 3 of the adhesive tape 1 will remain adhered to the adhesion means 55 and 55 because of the adhesive force.

Since adhesion means 55 located on end 53 of the lever 51 is thicker on the left side and thinner on the right side as shown in FIG. 9, the left side presses harder during the pressing operation, resulting in stronger adhesion.

Consequently, when the pressure is released, a strong separation force is applied to the cut end on the insertion side of the adhesive tape 1, and as explained in the previous working example, effective separation of the base material 2 and the peel-off backing 3 occurs at the cut end of the adhesive tape 1.

An application example of the working example will be explained using FIGS. 10(a) and (b). The separation structure is conFig.d such that the adhesive tape 1 is inserted from the side of the structure.

Figure 10A:
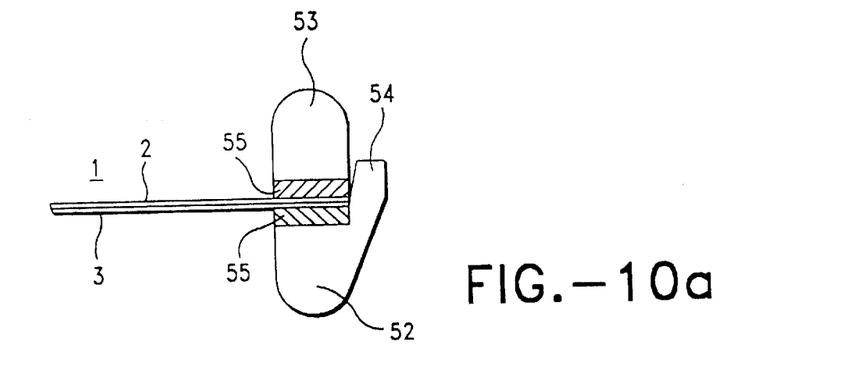
FIG. 10(a) shows a partial cross-section from the front side showing an applied example of Working example 5 of the invention.

Therefore, in FIG. 10(a), when the adhesive tape 1 is inserted from the left side, the cut end of the adhesive tape 1 touches positioning means 54 formed in part of lever 52.

Subsequently, when the ends of the levers are manually closed, the levers 52 and 53 press on the adhesive tape 1 via adhesion means 55 and 55.

After the motion, when the levers 52 and 53 are manually opened, the adhesion means 55 and 55 separate the base material 2 and the peel-off backing 3 of the adhesive tape 1.

Figure 10B:
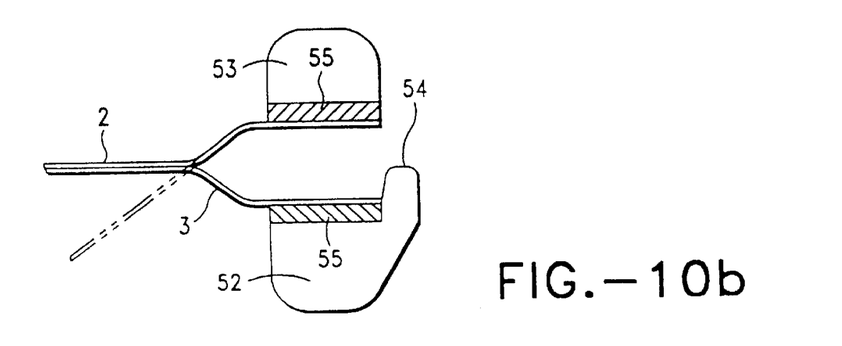
FIG. 10(b) shows a partial cross-section from the front side showing the state in which the adhesive tape has been separated from the state in FIG. 10(a).

The state is shown in FIG. 10(b). During the opening motion, the separation of the adhesion means 55 and 55 is executed beginning at the cut end of the adhesive tape 1.

The reason for this is as follows. As shown in FIGS. 10(a) and (b), because the adhesion means 55 is positioned up to the vicinity of the positioning means 54 in the separation structure, the separation action is executed beginning at the cut end of the adhesive tape 1 (such that the free end d explained above is nonexistent) during the separation. This results in high efficiency and reliability.

Furthermore, by setting a large opening distance for the levers, it is possible to plastically deform the base material 2 and peel-off backing 3, making separation of the two elements using fingers even easier because it possible to greatly separate the two elements after they have been removed from the separation structure.

Because separation structures possessing such a scissor-like structure are simple and do not require any drive mechanism, they can be built inexpensively. Additionally, these separation structures possess a wide application possibility, since they can be used for handling adhesive tape 1 used in tape wordprocessors as explained in the working examples above, for removing the wide peelable adhesive tape that is beginning to be used in postcards, etc., to protect privacy, as well as for cutting to a desired length and removing the peel-off backing from known two-sided tape.

After the adhesive tape 1 has been separated by the separating action of the separation structure, if only the peel-off backing 3, in particular, is strongly creased by bending the adhesive tape 1 in the manner indicated by the imaginary line in FIG. 10(b) before removing the adhesive tape 1 from adhesion means 55 and 55, the base material 2 and the peel-off backing 3 will not come close to each other after the adhesive tape 1 is removed from the separation structure, simplifying the handling of the adhesive tape 1.

In this case, since the base material 2 has not been significantly plastically deformed, it suffers no appearance degradation.

Although the operation described above can be manually performed by the user, it is possible to adopt a structure that separates the adhesive tape 1 using the opening/closing actions of the levers 52 and 53 and that at the same time forcibly changes the adhesive tape 1 as shown in the Figs.. Alternatively, it is also possible to crease either the base material 2 or peel-off backing 3 or both by slightly moving the adhesive tape 1 from the left side of the Fig. from the state indicated by the solid lines in FIG. 10(b), thus enabling efficient separation of the peel-off backing after the adhesive tape 1 is removed from the separation structure.

Since the scissor-like structure allows the user to perform the separation operation while observing the state of the adhesive tape 1, it offers usability not provided by other working examples.

It is also easy to subsequently separate the base material 2 and peel-off backing 3 by engaging the separation hooks installed on the opposing levers with the levers 52 and 53 near the end of their return motions. In this way, the materials 2 and 3 can then be easily separated from the adhesion means 55 and 55, improving ease of handling.

It is also possible to create a structure possessing the various effects described above by combining the structure with the various structures described in prior working examples.

The process of separating the adhesive tape 1 using the separation structure in FIGS. 9 and 10(a) is further explained below.

1) After the end of the adhesive tape 1 is first set such that it slightly overlaps the step of the positioning means 54, the levers 52 and 53 are closed. Then, the end or a corner of the end of the adhesive tape 1 can be creased in the same direction (shape) by the adhesion means 55 and 55 and by the positioning means 54 of the levers 52 and 53. The crease will appear as an approximate "<" shape when viewed from the side of the adhesive tape 1, and slight delamination will occur between base material 2 and peel-off backing 3 because of the difference in the bending radii of the creased areas and in the rigidity of the two elements.

2) Subsequently, when the vicinity of the area is pinched by the adhesion means 55 and 55 and then separated, the separation action progresses from the end or the corner using the slight delamination in the creased area as the starting point, producing a more reliable separation effect.

In process 2), it is possible to prevent appearance degradation caused by the deformation of the printed surface of the base material 2, as seen in conventional examples, because the creased area becomes flat again when pinched by the adhesion means 55 and 55.

Although the positioning means 54 and the lever 52 are integrated as a single unit in the configuration in the above example, other configurations are also possible. For example, if the positioning means 54 and the adhesion means 55 are integrated as a single unit, both the first process of slight creasing and the second process of separation can be performed in one step.

Further explanation is provided below. First, positioning means 54 in FIG. 10(a) is integrated with the adhesion means 55, and the adhesive tape 1 is set such that it rides slightly on top of the positioning means 54.

Next, the levers 52 and 53 are closed. Then, the adhesive tape 1 is pressed by the adhesion means 55 and 55, and is creased into an approximate "<" shape along the horizontal area of the adhesion means 55 of the levers 52 and the corner of the positioning means 54 (which is part of the adhesion means in this case).

During this operation, slight delamination occurs between the base material 2 and the peel-off backing 3 of the adhesive tape 1 because of the difference in the bending radii of the creased areas and in the rigidity of the two elements, as explained above.

Next, the levers 52 and 53 are opened. Then, the base material 2 and the peel-off backing 3 are separated by adhering to the adhesion means 55 and 55.

During this separation, because the slight delamination in the creased area acts as the starting point as before, the difference in adhesive strengths tends to occur easily, thus making it easy to achieve the separation and delamination.

Furthermore, the entire process is efficient because the first process of creasing and the second process of separation can be performed in one step as explained above.

During the creasing, the slight delamination due to the cause occurs more easily if the length parallel to the end area of the adhesive tape 1 is very short or if the corner of the end area is minute, as explained above. Consequently, the printed area on the surface of the base material 2 does not suffer any appearance damage, which is one of the effects of this working example.

The structure of this working example, which causes slight delamination by the minute creasing and which uses the vicinity of the slight delamination area as the starting point of the separation and delamination by adhering the adhesion means to the area, is not limited to methods that use levers 52 and 53. The structure can be applied to the various structures described above, and provides the effect of advantageously utilizing the difference in the adhesive strengths per unit area or the difference in the total adhesive strengths, improves the reliability of the adhesive strengths which tend to vary, and enhances practical usefulness.

As explained above, in the backing separation structure of an adhesive tape with peel-off backing described in the conventional example, the adhesive tape 1 is inserted into a small hole in thin cylinder 60, and is wrapped around the cylinder 60, and then the adhesive tape 1 is creased over a long section by linearly sliding only the cylinder 60, thus manually separating the base material 2 and the peel-off backing 3 of the adhesive tape 1. In contrast, as explained in the various working examples, the invention does not require either the operation of inserting the adhesive tape 1 into the small hole, or the operation of manually wrapping the adhesive tape around the cylinder 60 and sliding the cylinder. Therefore, the invention offers substantial improvement in productivity.

In the structure of the invention, when the adhesive tape 1 is inserted along the insertion opening provided in the main part of equipment such as the tape wordprocessor, the base material 2 and peel-off backing 3, which constitute the adhesive tape 1, automatically adhere to either the rotating adhesion means or reciprocating (rocking) adhesion means and become fastened. Subsequently, the base material 2 and peel-off backing 3 are automatically separated through the separation of the adhesion means from each other.

In this adhesion and fastening method, it is possible to separate the two elements by installing the adhesion means only for the base material 2 or for the peel-off backing 3 while mechanically fastening the other using hooks, etc., or by suctioning using vacuum, etc., instead of using an adhesion means. However, the structure which adheres both elements to the adhesion means is most economical and efficient when the following factors are taken into consideration: (a) the adhesive tape 1 is only 0.1–0.3 mm thick, that the base material 2 and peel-off backing 3 are only around 0.1 mm thick, and (b) the material used is usually a weak substance such as paper or plastic. Additionally, such a structure is ideal because it is highly reliable, allows selective adhesion and fastening of the two elements to the adhesion means, and can separate the elements in two opposite directions after adhesion.

This is because the adhesion method does not utilize the thicknesses of the base material 2 or peel-off backing 3 when fastening them onto respective adhesion means. As explained above, these elements are thin and weak, thus fastening does not depend on their thickness. Instead, the surface of the elements are used for fastening, which is a major structural characteristic of the invention.

In this way, by arranging, in the manner explained above, the adhesive strength between the adhesive compound 4 and the peel-off backing 3, the adhesive strength between the base material 2 and the corresponding adhesion means, and the adhesive strength between the peel-off backing 3 and the corresponding adhesion means, the two elements can be definitely, silently, and efficiently separated and delaminated, without any serious damage to the printed surface of the adhesive tape 1 as seen in the conventional example.

As explained above, the difference between adhesive strengths is an important point of the structure of the invention. The adhesive strength difference can be used to the best advantage by adhering the adhesion means to the end or the corner area of the adhesive tape 1 and by gradually separating the two elements beginning where adhesive strength is weak.

Furthermore, the two elements can be easily separated by slightly creasing the end or the corner area of the adhesive tape 1 to cause slight delamination in the area, by pressing and adhering the adhesion means to the vicinity of the area, and by using the area as the starting point of separation and delamination.

If the area between the end and the adhesion area between the adhesion means and the adhesive tape 1 is kept at a constant value, the relative magnitudes of the adhesive strengths will not be reversed even when variability occurs between them, thus ensuring stable separation and delamination of the two elements.

Rotating, reciprocating, or rocking types of adhesion means can be used, and each of these provides the characteristics described in the respective working examples. Particularly with the rocking-type structure, the user of a tape wordprocessor not equipped with the separation structure can manually and easily separate the adhesive tape 1 into base material 2 and peel-off backing 3, by using the well-known scissor-like structure as described above. Furthermore, this type of structure allows the receiver of postcards, etc., in which certain information has been covered by opaque peelable adhesive tape for privacy protection, to remove the adhesive tape using the simple operation described in the working example, unlike the cumbersome operation required in the conventional example.

Adhesive rubber, and well-known cellophane tape or vinyl tape, etc., with an adhesive compound can be used as the adhesion means. In particular, the adhesive rubber offers superior durability because of the following characteristic. When its surface picks up dust, etc., from the surface of the adhesive tape 1 and loses its adhesive strength, all that is necessary to recover its adhesive strength is to remove the adhesion means from the equipment such as a tape wordprocessor in which the backing removal structure is installed, and rinse the adhesive rubber with water.

Unlike the conventional structure, the backing removal structure of the invention, which uses the adhesion means, does not inflict friction-induced damage on the printed surface of the adhesive tape 1. Because the adhesion means is adhered without any friction and then removed using only a soft touch, the removal structure of the invention prevents the type of damage caused by a conventional method on base material 2, and prevents the base material 2 from falling off due to deformation-induced elasticity after the base material has been pasted on a desired location.

In the invention, the base material and peel-off backing of the adhesive tape were first adhered to the adhesion means, and then the two elements were separated by applying force in the separating directions via the adhesion means. One of the characteristics of the invention is that separation hooks are installed near the end of the separation action, in order to separate the base material and the peel-off backing of the adhesive tape from the adhesion means.

With this configuration, the elements can be easily extracted from the adhesion means of equipment such as tape wordprocessors after the base material and peel-off backing have been separated from each other, resulting in improved usability. Furthermore, in a rotating-type structure, the separation hooks allow continuous use of the separation structure.

Additionally, each of the structures described in the working examples of the invention is simple, requires only a small amount of motor power for driving the adhesion means due to the absence of the friction, does not interfere with size and thickness reduction of equipment such as the tape wordprocessor, is inexpensive, and can enhance product competitiveness.

Each of the structures described in the working examples of the invention can be used either alone or in combination with others. If combined, the structures will provide synergistic effects.

Furthermore, application of the invention is not limited to tape wordprocessors or postcards. The invention can be used as the backing removal structure in any equipment that uses adhesive tape with peel-off backing, and the use of the invention in a wide range of applications for removing the peel-off backing from the adhesive tape is well within the scope of the invention.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications applications and variations as may fall within the spirit and scope of the appended claims.

What is claimed is:

1. A structure for removing a peel-off backing from an adhesive tape, said adhesive tape including said peel-off backing on one side, a base material on an opposite side and an adhesive compound sandwiched between said peel-off backing and said base material, said structure comprising:

adhesion means for adhering to at least one side of said adhesive tape so that said adhesive tape has said side adhered to said adhesion means; and means for pulling said adhesion means to cause said peel-off backing and said base material to be separated from each other;

wherein said adhesion means applies a stronger adhesive strength onto said side of said adhesive tape than either the adhesive strength between said adhesive compound and said peel-off backing or the adhesive strength between said adhesive compound and said base material; and means for releasing said at least one side of said adhesive tape from said adhesion means whereby said adhesion means is continuously reusable for adhering to subsequent adhesive tape and for causing said peel-off backing and said base material to be separated in said subsequent adhesive tape.

2. The structure of claim 1 wherein said adhesion means has a width narrower than that of said adhesive tape and wherein said adhesion means is positioned off-centered of said adhesive tape.

3. The structure of claim 1 wherein said pulling means pulls said adhesion means by rotation.

4. The structure of claim 3 wherein said adhesion means is subsequently partially separated from said one side before said adhesion means rotates one full turn.

5. The structure of claim 1 wherein said pulling means pulls said adhesion means by reciprocation.

6. The structure of claim 1 wherein said adhesion means adheres to said peel-off backing of said adhesive tape thereby separating said peel-off backing from said base material and causing plastic deformation of said peel-off backing.

7. The structure of claim 1 wherein said adhesive tape has a free end of length d on which said adhesion means is not adhered and wherein said length d is not greater than the width of said adhesive tape.

8. The structure of claim 1 wherein said adhesion means includes means for feeding said adhesive tape in a predetermined direction.

9. A structure for removing a peel-off backing from an adhesive tape, said adhesive tape including said peel-off backing on one side, a base material on an opposite side and an adhesive compound sandwiched between said peel-off backing and said base material, said structure comprising:

adhesion means for adhering to an end area of at least one side of said adhesive tape so that said end area of said adhesive tape adheres to said adhesion means; and means for pulling said adhesion means to cause said peel-off backing and said base material to be separated from each other; and means for releasing said at least one side of said adhesive tape from said adhesion means whereby said adhesion means is continuously reusable for adhering to subsequent adhesive tape and for causing said peel-off backing and said base material to be separated in said subsequent adhesive tape.

10. The structure of claim 9 wherein said pulling means gradually pulls said adhesion means away from said end area of said adhesive tape.

11. The structure of claim 9 wherein at least said end area is curled on said adhesion means and said pulling means pulls away said adhesion means from said curled end area.

12. The structure of claim 9 wherein said adhesion means has a width narrower than that of said adhesive tape and wherein said adhesion means is positioned off-centered of said adhesive tape.

13. The structure of claim 9 wherein said pulling means pulls said adhesion means by rotation.

14. The structure of claim 9 wherein said pulling means pulls said adhesion means by reciprocation.

15. The structure of claim 14 wherein said adhesion means is subsequently partially separated from said adhesive tape at said end area to complete separation between said peel-off backing and said base material.

16. The structure of claim 9 wherein said adhesion means includes means for feeding said adhesive tape in a predetermined direction.

\* \* \* \* \*